United States Patent
Bailey

(10) Patent No.: US 7,290,402 B1
(45) Date of Patent: Nov. 6, 2007

(54) EXPANSION VALVE CONTROL SYSTEM AND METHOD AND REFRIGERATION UNIT EMPLOYING THE SAME

(75) Inventor: Patrick M. Bailey, Snellville, GA (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 226 days.

(21) Appl. No.: 10/747,460

(22) Filed: Dec. 29, 2003

(51) Int. Cl.
*F25B 41/04* (2006.01)
(52) U.S. Cl. ...................... 62/225; 236/92 B
(58) Field of Classification Search .......... 62/222, 62/224, 225; 236/92 B
See application file for complete search history.

(56) References Cited

U.S. PATENT DOCUMENTS

| | | | | |
|---|---|---|---|---|
| 4,689,968 A | * | 9/1987 | McCulloch et al. | 62/225 |
| 5,551,248 A | * | 9/1996 | Derosier | 62/155 |
| 5,771,703 A | * | 6/1998 | Rajendran | 62/204 |
| 6,318,101 B1 | * | 11/2001 | Pham et al. | 62/225 |

* cited by examiner

*Primary Examiner*—Marc Norman

(57) ABSTRACT

An expansion valve control system, a method of controlling an expansion valve and a refrigeration unit incorporating the same. In one embodiment, the expansion valve control system includes (1) a superheat error circuit configured to derive a superheat error for a fluid associated with the expansion valve and (2) a valve position circuit, associated with the superheat error circuit, configured to reposition the expansion valve proportionally based on both a current position thereof and the superheat error.

21 Claims, 5 Drawing Sheets

EXPANSION VALVE CONTROL SYSTEM AND METHOD AND REFRIGERATION UNIT EMPLOYING THE SAME

TECHNICAL FIELD OF THE INVENTION

The present invention is directed, in general, to air conditioning and refrigeration systems and, more specifically, to an expansion valve control system and method and refrigeration unit employing the same.

BACKGROUND OF THE INVENTION

Refrigeration systems usually include an evaporator, a condenser, a compressor, an expansion valve and a controller. Typically, in a residential air conditioning system, the evaporator and controller is located inside, the condenser and compressor are located outside and the expansion valve is located inside between an outlet of the condenser and an inlet of the evaporator. The expansion valve regulates the flow rate of a refrigerant through the evaporator to obtain a desired temperature in a space to be cooled, or cooling space.

The controller can be programmed to control operation of the refrigeration system based on inputs from various temperature and pressure sensors to obtain the desired temperature in the cooling space. Opening and closing of the expansion valve, for example, may be controlled by the controller based on a measured temperature differential across the evaporator. This temperature differential is commonly referred to as a superheat.

Formerly, the method of measuring superheat was to subtract an evaporator coil inlet temperature from an evaporator coil outlet temperature. This method, however, was often inaccurate or unresponsive to changes. Accordingly, an improved method of determining superheat and, therefore superheat error, was needed to provide a more dynamic and accurate superheat measurement. One such improved method that was developed for measuring superheat converts a measured coil outlet pressure at the evaporator to a Saturated Vapor Temperature (SVT), which is based upon a specified refrigerant, and subtracts that result from the measured evaporator coil outlet temperature. A pressure transducer may be attached to the outlet of the evaporator coil to obtain the coil outlet pressure for the superheat measurement. Though an improved superheat measurement can now be determined, existing refrigeration systems have not advantageously employed the improved superheat measurement to control operations thereof.

Accordingly, what is needed in the art is a refrigeration system that is responsive to dynamic superheat error measurements. More specifically, what is needed in the art is a refrigeration system with an improved equipment protection system that responds quickly to changes in system loads and ambient conditions.

SUMMARY OF THE INVENTION

To address the above-discussed deficiencies of the prior art, the present invention provides an expansion valve control system, a method of controlling an expansion valve and a refrigeration unit incorporating the same. In one embodiment, the expansion valve control system includes (1) a superheat error circuit configured to derive a superheat error for a fluid associated with the expansion valve and (2) a valve position circuit, associated with the superheat error circuit, configured to reposition the expansion valve proportionally based on both a current position thereof and the superheat error.

The present invention allows optimal control of a refrigeration system expansion valve during various operating conditions. Advantageously, repositioning of the expansion valve is proportional to the superheat error. When operating under heavy load conditions, such as, an initial temperature pull-down or following a defrost cycle, the present invention rapidly increases the expansion valve position in response to high values of superheat. As the load decreases over time, the expansion valve position responds by gradually decreasing.

When operating under normal conditions, the expansion valve position is stable and changes in small increments. Additionally, when operating under low ambient conditions or if the proximity of the evaporator coil to the compressor is very close, the expansion valve control becomes very protective of the compressor and reacts quickly by closing the valve to increase the measured superheat. Thus, the present invention provides intelligent control of the expansion valve allowing non-linear changes that provide optimal performance of the refrigeration system under different operating conditions.

In another embodiment, the present invention provides a method of controlling an expansion valve including (1) deriving a superheat error for a fluid associated with the expansion valve and (2) repositioning the expansion valve proportionally based on both a current position thereof and the superheat error.

In yet another embodiment, the present invention provides a refrigeration unit including (1) a superheat error circuit configured to derive a superheat error for a fluid associated with the expansion valve and (2) a valve position circuit, associated with the superheat error circuit, configured to reposition the expansion valve proportionally based on both a current position thereof and the superheat error.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
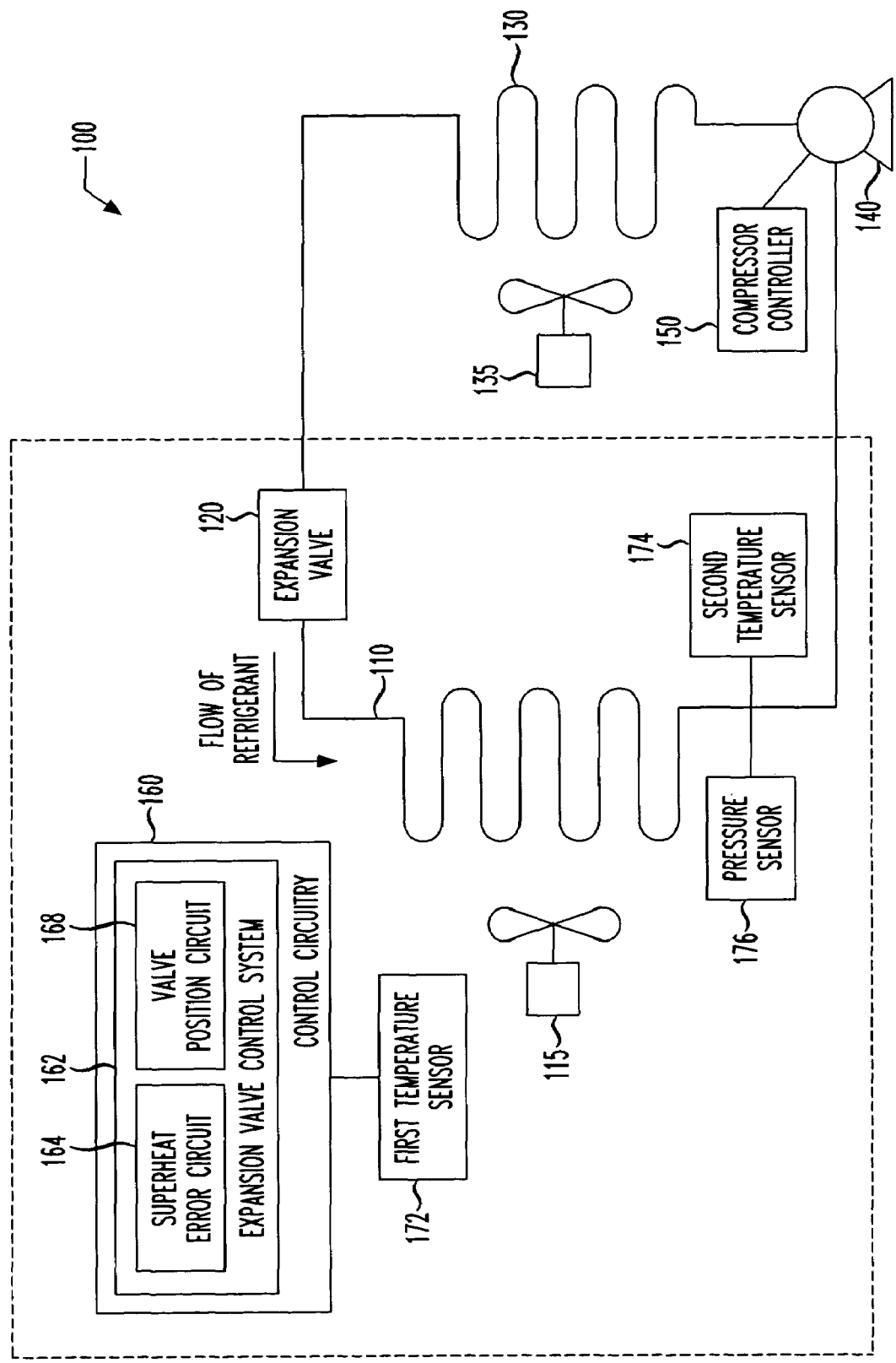
FIG. 1 illustrates a block diagram of a refrigeration unit constructed in accordance with the principles of the present invention.

Referring initially to FIG. 1, illustrated is a block diagram of a refrigeration unit, generally designated 100, constructed in accordance with the principles of the present invention. The refrigeration unit 100 includes an evaporator 110, an evaporator fan 115, an expansion valve 120, a condenser 130, a condenser fan 135, a compressor 140, a compressor controller 150 and control circuitry 160 including an expansion valve control system 162. The refrigeration unit 100 also has control sensors including a first temperature sensor 172, a second temperature sensor 174 and a pressure sensor 176. Components of the refrigeration unit 100 that are typically located inside are indicated within the dashed line of FIG. 1. Inside may be within a cooling space or within a space associated with the cooling space. One skilled in the art will understand that the refrigeration unit 100 may include additional components that are commonly employed within conventional refrigeration units that are not illustrated or discussed, such as, a defrost heater and an associated temperature sensor.

The refrigeration unit 100 provides cooling for a space, such as, a residence. The present invention, however, is not limited to a cooling space for a residence but is also applicable to other cooling systems, such as, commercial and industrial refrigeration systems. Some examples of other applicable cooling systems include mobile cooling systems, freezers, refrigerators, etc.

The evaporator 110 is a heat transfer coil with multiple passes that provides an indoor space heat exchanger for the refrigeration unit 100. The evaporator fan 115 directs ambient air across the evaporator 110 from the cooling space to facilitate cooling. The condenser 130 is also a heat transfer coil having multiple passes that allows removal of heat to the environment that was obtained by a refrigerant flowing through the evaporator 110. The refrigerant is a fluid commonly used for heat transfer, such as, Freon. The condenser fan 135 moves air across the condenser 130 to facilitate the heat transfer. The compressor 140, coupled to the evaporator 110 and the condenser 130, circulates the refrigerant through the condenser 130 and the evaporator 110. The compressor 140 compresses the refrigerant causing it to become a hot, high-pressured gas. The compressor controller 150, coupled to the compressor 140, is a contacter employed to provide voltage to the compressor 140. Typically, the compressor controller is coupled to the control circuitry 160. The condenser 130, the condenser fan 135, the compressor 140 and the compressor controller 150 are usually located externally within a metal frame and commonly referred to as a condensing unit. The evaporator 110, the evaporator fan 115, the condenser 130, the condenser fan 135, the compressor 140 and the compressor controller 150 may be conventional components typically employed within common refrigeration units.

Coupled between an outlet of the condenser 130 and an inlet of the evaporator 110, the expansion valve 120 is a regulating device that controls a flow rate of the refrigerant through the evaporator 110. The expansion valve 120 is an electric step motor that is adjustable in selected increments to regulate the flow rate based on inputs from the control sensors. Typically, the expansion valve 120 has a total of 255 equivalent increments or steps. Of course, in other embodiments, the expansion valve 120 may have a different number of steps or non-equivalent steps. When fully opened, the expansion valve 120 allows the refrigerant to enter the evaporator 110 substantially unrestricted. In a fully closed position, the expansion valve 120 substantially restricts the refrigerant from entering the evaporator 110.

The first temperature sensor 172 is located within the cooling space and measures the ambient air temperature thereof. The second temperature sensor 174 and the pressure sensor 176 are positioned on the outlet of evaporator 110 and are employed to determine a superheat of the refrigerant. The first temperature sensor 172 and the second temperature sensor 174 are typically thermistors. The pressure sensor 176 is typically a pressure transducer.

The control circuitry 160 is configured to control operation of the refrigeration unit 100. The control circuitry 160 may include a microcomputer or other logic circuitry and a control board having a plurality of input and output connections. The control circuitry 160 may employ various sensors coupled to the output connections, including the control sensors, to control operation of the refrigeration unit 100.

The control circuitry 160 includes the expansion valve control system 162. The expansion valve control system 162 controls the positional adjustment of the expansion valve 120 based upon a superheat error. The expansion valve control system 162 may be employed as a sequence of operating instructions, as hardware or a combination thereof. The expansion valve control system 162 may be embodied as an algorithm. In some embodiments, the expansion valve control system 162 may be configured to operate based on algorithms representing the methods illustrated in FIGS. 2-5 and discussed below.

The expansion valve control system 162 includes a superheat error circuit 164 and a valve position circuit 168. The superheat error circuit 164 is configured to derive the superheat error for the refrigerant. The superheat error is a difference between a current measured superheat and an established target superheat programmed by an installer. Typically, a default superheat value of eight degrees Fahrenheit is set during manufacturing. The installer may change the superheat from the default value based on knowledge of what a typical condensing unit superheat would be year-round. The installer may consider several factors, such as, a distance between the evaporator 110 and the condensing unit and whether or not suction and liquid lines are insulated. Typically, the installer wants to maintain 20° Fahrenheit superheat at the condensing unit. This may require, for example, setting the superheat at the evaporator 110 to 15° Fahrenheit in order to maintain the 20° Fahrenheit at the condensing unit. In the refrigeration unit 100, the level of superheat of the refrigerant as it passes through the outlet of the evaporator 110 is calculated by subtracting the result of a calculated SVT from a measured evaporator outlet temperature. The SVT calculation is based upon the type of refrigerant used and the current outlet pressure measured by the pressure sensor 176.

The valve position circuit 168, associated with the superheat error circuit 166, is configured to reposition the expansion valve 120 proportionally based on both a current position thereof and the superheat error. The valve position circuit 168 may be configured to reposition the expansion valve discontinuously. In some embodiments, the valve position circuit 168 is configured to reposition the expansion valve only after the superheat error reaches a steady state.

The valve position circuit may be configured to reposition the expansion valve proportionally based on a power of the superheat error. Thus, the flow rate is changed minimally when the superheat error is small with more drastically when the superheat error greater. Additionally, the valve position circuit 168 may be configured to employ separate proportional control algorithms based on a direction in which the expansion valve is repositioned. Accordingly, the valve position circuit 168 can be configured to open and close the expansion valve 120 at different rates. Furthermore, the valve position circuit 168 may be configured to reposition the expansion valve proportionally only when the superheat error exceeds a lower threshold.

One skilled in the art will understand that the refrigeration unit 100 may include additional circuitry that is employed to control operation of or protect components of the refrigeration unit 100. For example, the refrigeration unit 100 may include timers, additional sensors, and other electrical safety circuits that may be located proximate the evaporator or the condenser.

Figure 2:
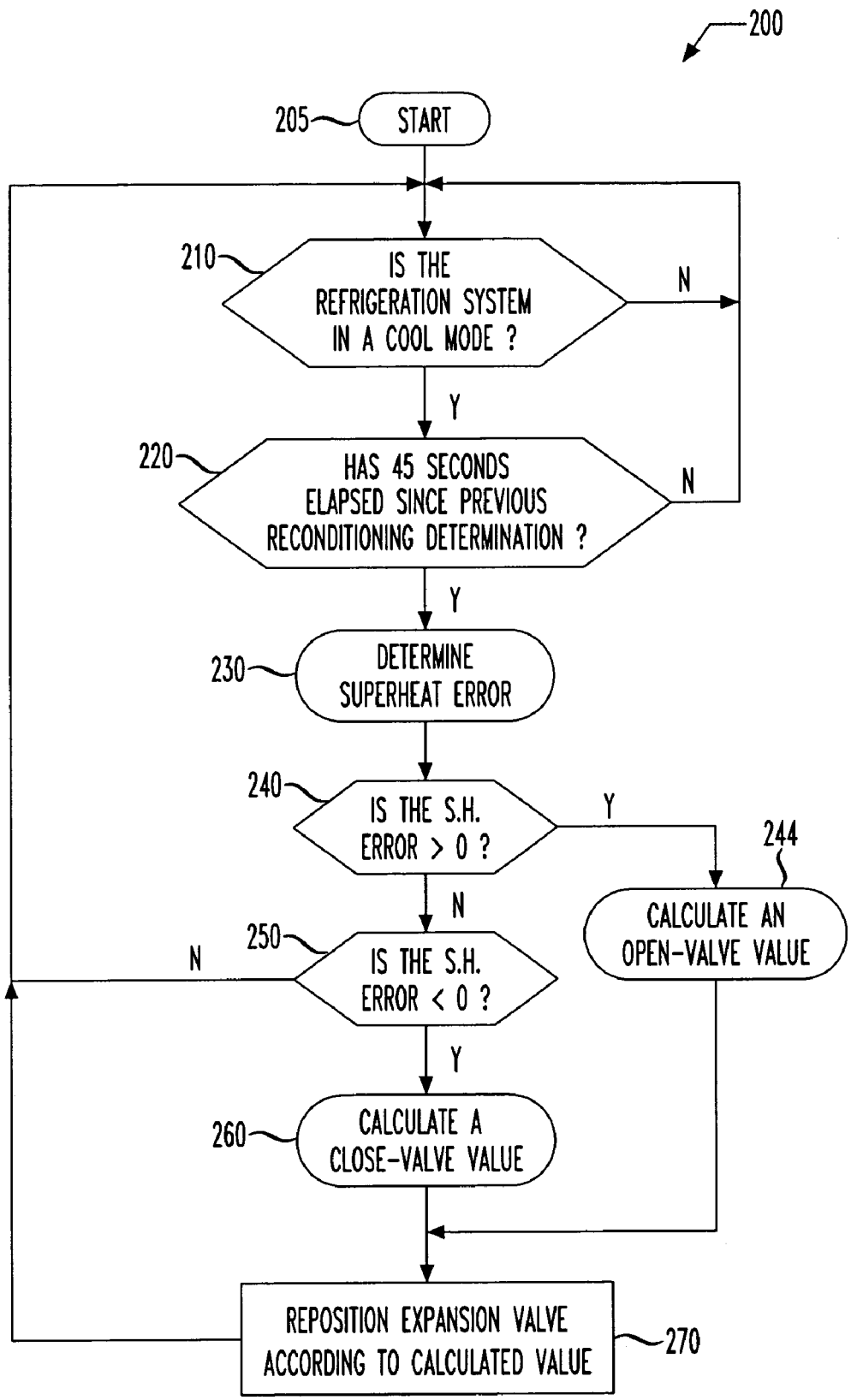
FIG. 2 illustrates a method of controlling an expansion valve carried out in accordance with the principles of the present invention.

Turning now to FIG. 2, illustrated is a method of controlling an expansion valve, generally designated 200, carried out in accordance with the principles of the present invention. Typically, the expansion valve is associated with a refrigeration system. Control circuitry, more specifically an expansion valve control system, may provide control for the expansion valve according to the method 200. The method 200 begins in a step 205 with an intent to control an expansion valve.

After beginning, a determination is made if the refrigeration system is in a cool mode in a first decisional step 210. Control circuitry associated with the refrigeration system determines if the refrigeration system is presently in the cool mode. If the refrigeration system is in the cool mode, the method 200 continues to a second decisional step 220 that determines if 45 seconds has elapsed since a previous determination if repositioning of the expansion valve is needed. A timer associated with the control circuitry may determine if 45 seconds has elapsed since the previous, or last, repositioning determination was performed. In the method 200, the 45 seconds represent an amount of time needed for a superheat error of the refrigeration system to obtain a steady state after repositioning of the expansion valve. In other embodiments, the amount of time to reach a steady state can differ from 45 seconds.

The expansion valve does not have to be repositioned, however, based on each repositioning determination. In other words, the method 200 may have determined that repositioning of the expansion valve was not needed at the previous determination. Thus, repositioning of the expansion valve is discontinuous. This reduces unnecessary repositioning of the expansion valve and promotes a steady state for the refrigeration system. If the refrigeration system is not in the cool mode or 45 seconds has not elapsed since the last repositioning determination, the method 200 returns to the step 210.

If 45 seconds has elapsed since the previous repositioning determination, a superheat error is derived in a step 230. The superheat error is derived for a fluid associated with the expansion valve. Typically, the fluid is a refrigerant such as Freon. In some embodiments, a superheat error circuit may derive the superheat error. The superheat error may be derived according to a method illustrated in FIG. 3 and discussed with respect thereto.

After determining the superheat error, a determination is made if the superheat error is greater than zero (00.00) in a third decisional step 240. If the superheat error is not greater than zero, a determination is made if the superheat error is less than zero in a fourth decisional step 250. The superheat error circuit may compare the superheat error to zero to determine if the superheat error is greater than or less than zero.

If the superheat error is less than zero, a close-valve value is calculated in a step 260. Typically, the expansion valve is an electric step motor that is adjustable in selected increments to regulate the flow rate of the refrigerant through the refrigeration system. Accordingly, the close-valve value may be a step-change value of the number of increments, or steps, to close the expansion valve to reduce the flow of the refrigerant. The close-valve value may be calculated by a valve position circuit associated with the superheat error circuit. Calculating the close-valve value will be discussed in more detail with respect to FIG. 4.

After calculating the close-valve value, the expansion valve is repositioned according to the close-valve value in a step 270. The expansion valve may be repositioned by the valve position circuit. In some embodiments, the close-valve or open-valve value for repositioning may be zero and the expansion valve, accordingly, is not repositioned. After repositioning the expansion valve, the method 200 returns to step 210 and continues as before.

Returning now to step 240, if the superheat error is greater than zero, an open-valve value is calculated in a step 244. The open-valve value may be a step-change value of the number of increments, or steps, to open the expansion valve to increase the flow of the refrigerant. The valve position circuit may also calculate the open-valve value. Calculating the open-valve value will be discussed in more detail with respect to FIG. 5.

After calculating the open-valve value, the method proceeds to step 270 where the expansion valve is repositioned according to the open-valve value. The calculated value used for repositioning in step 270 depends on if the expansion valve is being opened or closed. After repositioning, the method 200 returns to step 210 and continues as discussed above.

Returning now to step 250, if the superheat error is not less than zero, no repositioning of the expansion valve is needed and the method returns to step 210. Thus, the present invention does not reposition the expansion valve continuously.

Figure 3:
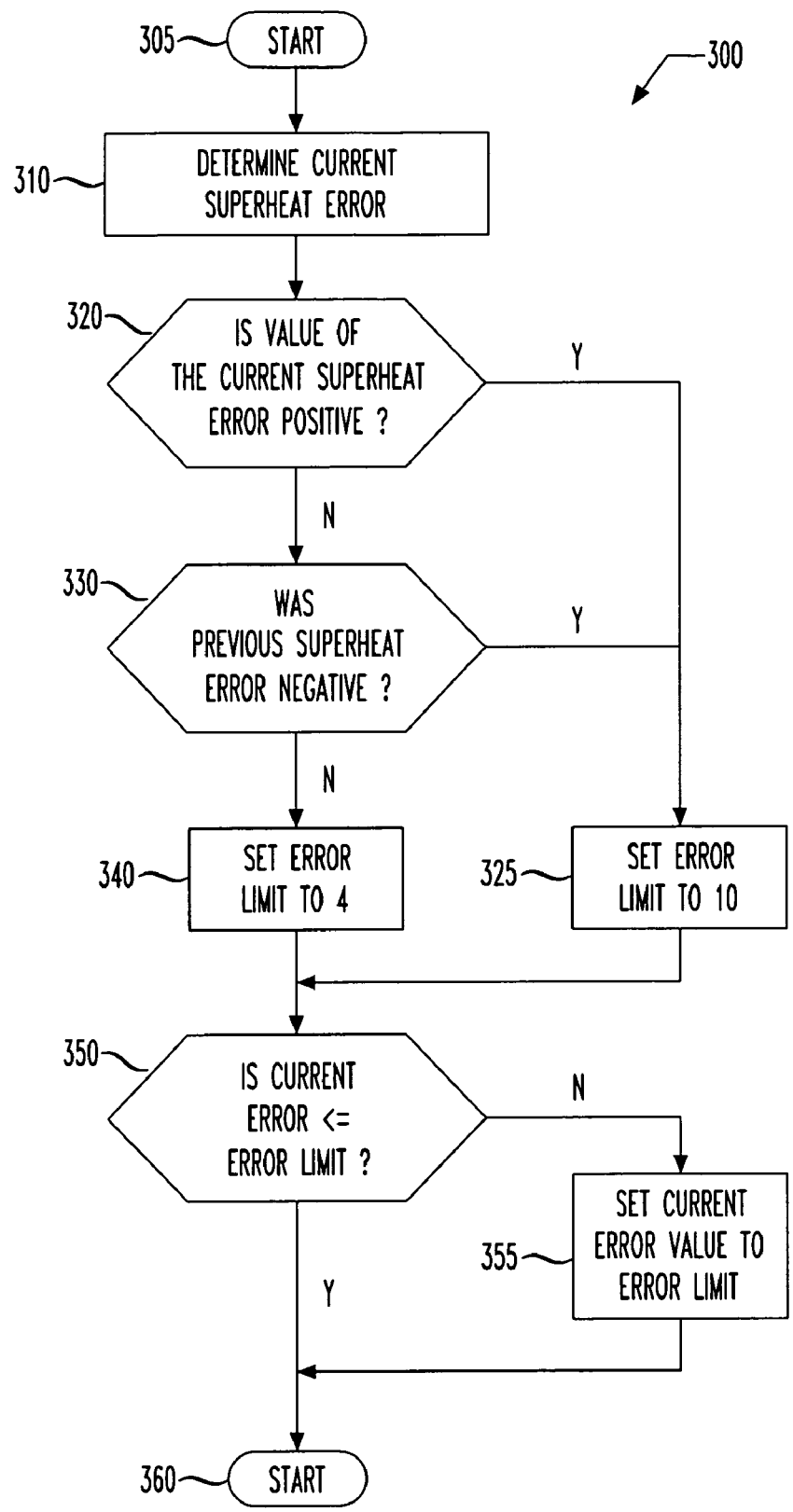
FIG. 3 illustrates a method of calculating superheat error carried out in accordance with the principles of the present invention.

Turning now to FIG. 3, illustrated is a method of calculating superheat error, generally designated 300, carried out in accordance with the principles of the present invention. The method 300 begins in a step 305 with an intent to calculate superheat error.

After beginning, a current superheat error is determined in a step 310. The current superheat error is determined by subtracting a target superheat set point from a current measured superheat. The target superheat set point may be based on some or all of the following: a thermostat setting, a mechanical installation configuration, or ambient temperature conditions associated with the refrigeration system. The current measured superheat is determined by converting a measured evaporator coil outlet pressure to a SVT that is then subtracted from a measured evaporator coil outlet temperature. The current measured superheat may be determined by control circuitry employing inputs from temperature and pressure sensors. For example, a superheat error circuit of the control circuitry may determine the current measured superheat. This method of determining the superheat provides a dynamic and accurate measurement. Of course, the superheat value of the refrigeration system may be determined by other methods.

After determining the current superheat error, a determination is made if the current superheat error is positive in a first decisional step 320. The current superheat error is positive if the current measured superheat is greater than the target superheat. Accordingly, the current superheat error is negative if the current measured superheat is less than the target superheat.

If the current superheat error is negative, a determination is made if the previous superheat error was negative in a second decisional step 330. The previous superheat error may be the superheat error at the last expansion valve repositioning. Alternatively, the previous superheat error may be the superheat error at the last repositioning determination. A history of previous superheat errors may be stored within logic circuitry associated with the superheat error circuit.

If the previous superheat error was positive, an error limit is set at four in a step 340. A value of four is selected for the error limit in order to reduce large value valve position changes caused by spurious low superheat readings. A value of four was determined through statistical experimentation. Returning now to step 320, if the current superheat error is positive, an error limit is set to ten in a step 325. Likewise, if it was determined that the previous superheat error was negative in step 330, the error limit is also set to ten in step 325. The values of four and ten are selected for the error limits based on statistical experimentation. Of course, the error limit may be set at other values in different embodiments. Establishing the error limits allows a control of the maximum allowed step change in different circumstances. Excessive step changes when unwarranted can cause system instability. After setting the error limit to ten, the method proceeds to step 350 and continues.

After setting the error limit, a determination is made if the current superheat error is less than or equal to the error limit in a third decisional step 350. Based on the values of the current superheat error and the previous superheat error, the error limit may either be set at four or ten. If the current superheat error is less than or equal to the error limit, then the method 300 ends in a step 360. If the current superheat error is not less than or equal to the error limit, which may be either four or ten, the current superheat error is set to the error limit in a step 355. The method 300 then proceeds to step 360 and ends.

Figure 4:
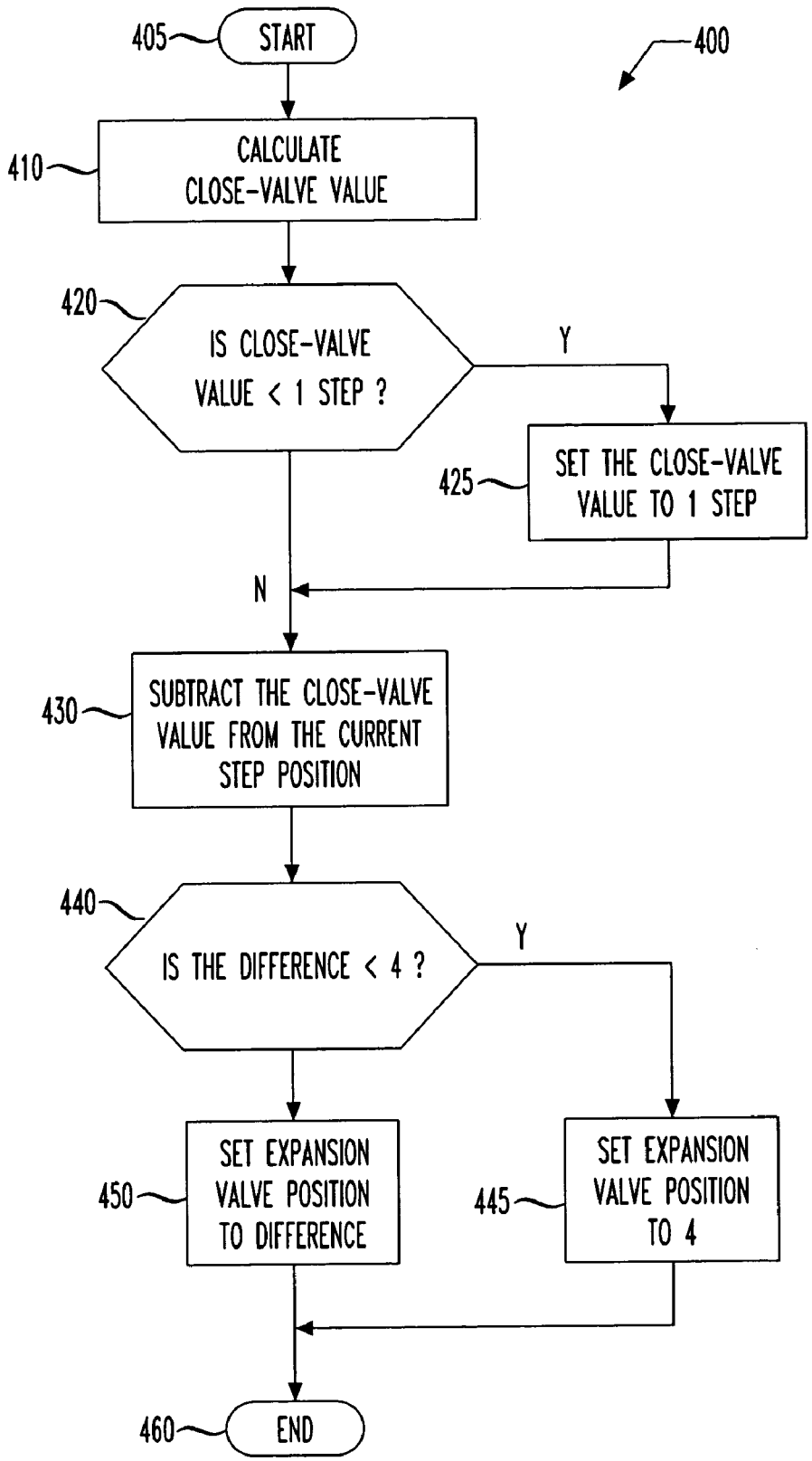
FIG. 4 illustrates a method of calculating an close-valve value carried out in accordance with the principles of the present invention.

Turning now to FIG. 4, illustrated is a method of calculating a close-valve value for an expansion valve, generally designated 400, carried out in accordance with the principles of the present invention. The method 400 begins in a step 405 with an intent to calculate an close-valve value.

After starting, a close-valve value for the expansion valve is calculated in a step 410. Referring back to step 260 of FIG. 2, a determination has already been made that repositioning of the expansion valve is needed and that, based on the superheat error being less than zero, the current position of the expansion valve should be decreased by some amount. The expansion valve may be repositioned proportionally based on a power of the superheat error. A valve position circuit may determine the close-valve value. In some embodiments, the close-valve value may be determined based on an algorithm representing Equation 1.

$$\text{close-valve value} = (((|S.H.\ \text{Error}|^3)/16) * \text{Current Step Position})/255 \quad (1)$$

In Equation 1, S.H. represents superheat of the refrigeration system, 255 refers to the expansion valve's total number of steps and 16 represents a factor determined through statistical experimentation. In other embodiments, another factor may be employed instead of 16. Additionally, the total number of steps, 255, may differ depending on the expansion valve that is used.

After calculating the close-valve value, a determination is made if the calculation result is less than one step in a first decisional step 420. If the calculation result is not less than one step, the calculated close-valve value is subtracted from a current step position of the expansion valve in a step 430. If the calculation result is less than one step, the close-valve value is set to one step in a step 425. The valve positioning circuit may make the determination and subsequent subtraction and setting. The method 400 then continues to step 430.

After subtracting the close-valve value from a current step position of the expansion valve, a determination is made in a second decisional step 440 if the difference between the close-valve value and the current step position is less than four. If the difference is not less than four, a new valve position is set equal to the difference in a step 450. The method 400 then proceeds to a step 460 and ends. If the difference is not less than four, a new valve position is set equal to four in a step 445. The method 400 then continues to step 460.

Figure 5:
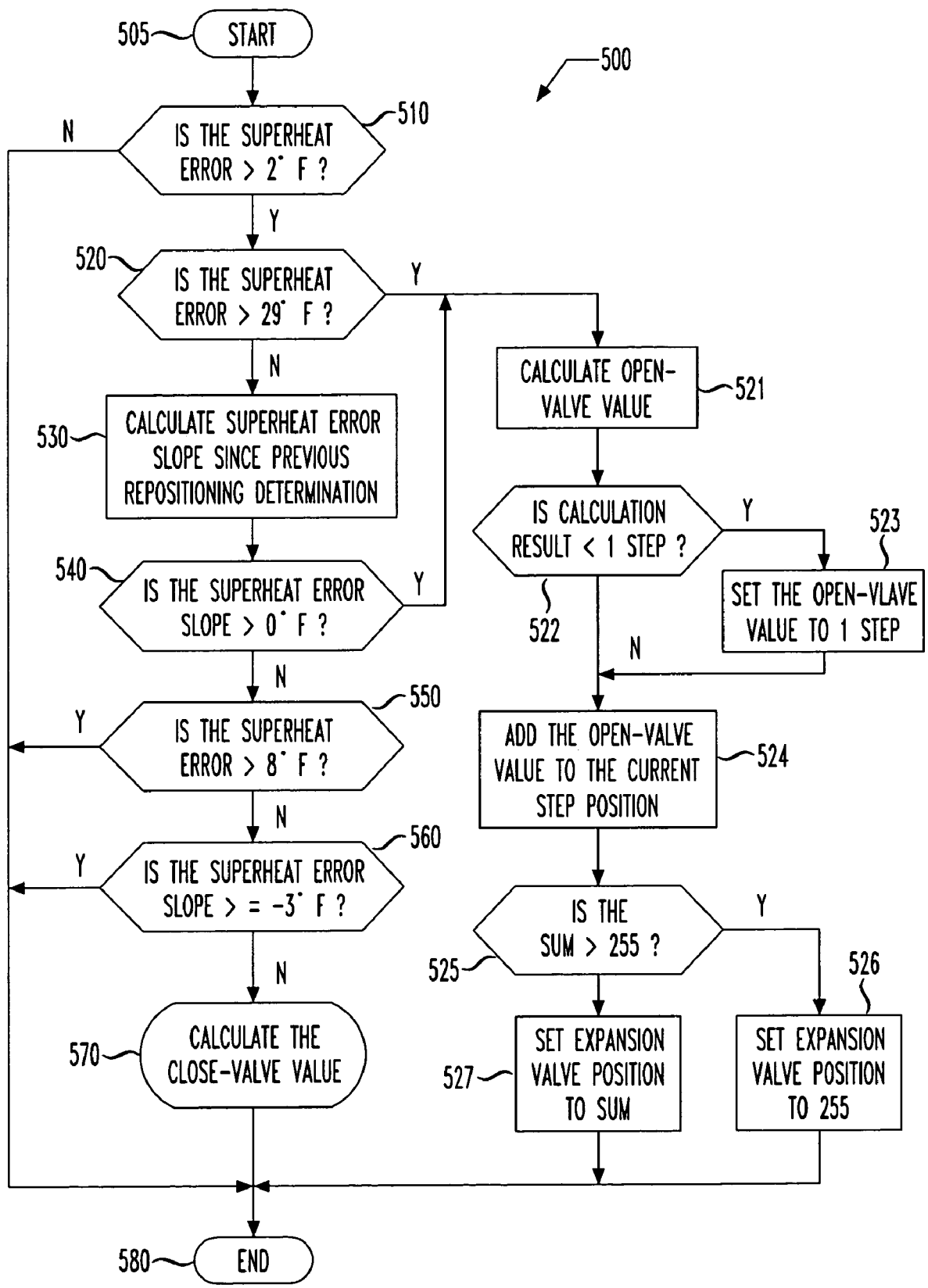
FIG. 5 illustrates a method of calculating a open-valve value carried out in accordance with the principles of the present invention.

Turning now to FIG. 5, illustrated is a method of calculating an open-valve value, generally designated 500, carried out in accordance with the principles of the present invention. An expansion valve control system may perform the method 500 embodied as an algorithm. The method 500 begins in a step 505 with an intent to calculate an open-valve step-change value.

After starting, a determination is made in a first decisional step 510 if a superheat error is greater than two degrees Fahrenheit. Referring to step 244 of FIG. 2, the superheat error has already been determined to be positive, and is now further examined to determine if it is greater than two degrees Fahrenheit. If the superheat error is greater than two degrees Fahrenheit, a determination is made if the superheat error is greater that 29 degrees Fahrenheit in a second decisional step 520.

If the superheat error is not greater that 29 degrees Fahrenheit, a superheat error slope since a previous repositioning determination is calculated in a step 530. The previous repositioning determination may or may not have resulted in the expansion valve being repositioned. The superheat error slope since the last repositioning determination is determined by subtracting the superheat error recorded during the previous repositioning determination from the current superheat error. If the current superheat error is greater than the previous error, the error slope will be increasing, or positive. If the current superheat error is less than the previous superheat error, the superheat error slope will be decreasing, or negative. The magnitude and the sign of the superheat error slope may be recorded in logic circuitry associated with the expansion valve.

A determination is then made in a third decisional step 540 if the superheat error slope is greater than zero degrees Fahrenheit. If the superheat error slope is not greater than zero degrees Fahrenheit, a determination is made if the superheat error is greater than eight degrees Fahrenheit in a fourth decisional step 550. If the superheat error is not greater than eight degrees Fahrenheit, a determination is made if the superheat error slope is greater than or equal to minus three degrees Fahrenheit in a fifth decisional step 560.

If the superheat error slope in not greater than or equal to minus three degrees Fahrenheit, then the close-valve value is calculated in a step 570. A superheat error slope less than minus three degrees Fahrenheit represents the superheat error is dropping quickly. This fact, along with the fact that the magnitude of the superheat error is less than eight degrees Fahrenheit requires closing the expansion valve instead of opening it. Accordingly, the close-valve value is then determined in a step 570. The close-valve value may be determined according to FIG. 4 as discussed above. After determining the close-valve value, the method 500 ends in a step 580.

Returning now to step 510, if the superheat error is not greater than two degrees Fahrenheit, then no repositioning of the expansion valve is needed. Accordingly, the method proceeds to step 580 and ends. Additionally, returning to steps 550 and 560, if the superheat error is greater than eight degrees Fahrenheit (step 550) or the superheat slope is greater than or equal to minus three degrees Fahrenheit (step 560), then the method 500 also continues to step 580 and ends.

Returning now to step 520, if the superheat error is greater than 29 degrees Fahrenheit, an open-valve value is calculated in a step 521. To determine the open-valve value, an algorithm representing Equation 2 may be employed.

$$\text{open-valve value} = (((|S.H. \text{ Error}|^3)/28)^*\text{Current Step Position})/255. \quad (2)$$

In Equation 2, S.H. represent superheat, 28 is a factor based on statistical experimentation and 255 represents the number of steps of the expansion valve.

After calculating the open-valve value, a determination is made if the calculated open-valve value is less than one step in a sixth decisional step 522. If the calculated open-valve value is not less than one step, the calculated open-valve value is added to the current step position of the expansion valve in a step 524. If the calculated open-valve value is less than one step, the open-valve value is set at one step in a step 523. The method 500 then proceeds to step 524 and continues.

A determination is then made if the sum of the calculated open-valve value and the current step position of the expansion valve is greater than 255 in a seventh decisional step 525. If the sum is not greater, a new valve position is set equal to the sum value in a step 527. If the sum is greater, a new valve position is set to 255 in a step 526. The method 500 then proceeds to step 580 and ends.

Although the present invention has been described in detail, those skilled in the art should understand that they can make various changes, substitutions and alterations herein without departing from the spirit and scope of the invention in its broadest form.

What is claimed is:

1. An expansion valve control system, comprising:
   a superheat error circuit configured to derive a superheat error for a fluid associated with said expansion valve; and
   a valve position circuit, associated with said superheat error circuit, configured to reposition said expansion valve proportionally based on a product of a value representing a current position of said expansion valve and said superheat error.

2. The system as recited in claim 1 wherein said valve position circuit is configured to reposition said expansion valve only after said superheat error reaches a steady state.

3. The system as recited in claim 1 wherein said valve position circuit is configured to reposition said expansion valve discontinuously.

4. The system as recited in claim 1 wherein said valve position circuit is configured to reposition said expansion valve proportionally based on a power of said superheat error, said power greater than one.

5. The system as recited in claim 1 wherein said superheat error circuit derives said superheat error by converting a measured evaporator coil outlet pressure to a saturated vapor pressure and subtracting said saturated vapor pressure from a measured evaporator coil outlet temperature.

6. The system as recited in claim 1 wherein said valve position circuit is configured to employ separate proportional control algorithms based on a direction in which said expansion valve is repositioned.

7. The system as recited in claim 1 wherein said valve position circuit is configured to reposition said expansion valve proportionally only when said superheat error exceeds a lower threshold.

8. A method of controlling an expansion valve, comprising:
   deriving a superheat error for a fluid associated with said expansion valve; and
   repositioning said expansion valve proportionally based on a product of a value representing a current position of said expansion valve and said superheat error.

9. The method as recited in claim 8 wherein said repositioning comprises repositioning said expansion valve only after said superheat error reaches a steady state.

10. The method as recited in claim 8 wherein said repositioning comprises repositioning said expansion valve discontinuously.

11. The method as recited in claim 8 wherein said repositioning comprises repositioning said expansion valve proportionally based on a power of said superheat error, said power greater than one.

12. The method as recited in claim 8 wherein deriving comprises:
    converting a measured evaporator coil outlet pressure to a saturated vapor pressure; and
    subtracting said saturated vapor pressure from a measured evaporator coil outlet temperature.

13. The method as recited in claim 8 wherein said repositioning comprises employing separate proportional control algorithms based on a direction in which said expansion valve is repositioned.

14. The method as recited in claim 8 wherein said repositioning comprises repositioning said expansion valve proportionally only when said superheat error exceeds a lower threshold.

15. A refrigeration unit, comprising:
    a superheat error circuit configured to derive a superheat error for a fluid associated with said expansion valve, and
    a valve position circuit, associated with said superheat error circuit, configured to reposition said expansion valve proportionally based on a product of a value representing a current position of said expansion valve and said superheat error.

16. The refrigeration unit as recited in claim 15 wherein said valve position circuit is configured to reposition said expansion valve only after said superheat error reaches a steady state.

17. The refrigeration unit as recited in claim 15 wherein said valve position circuit is configured to reposition said expansion valve discontinuously.

18. The refrigeration unit as recited in claim 15 wherein said valve position circuit is configured to reposition said expansion valve proportionally based on a power of said superheat error, said power greater than one.

19. The refrigeration unit as recited in claim 15 wherein said superheat error circuit derives said superheat error by converting a measured evaporator coil outlet pressure to a saturated vapor pressure and subtracting said saturated vapor pressure from a measured evaporator coil outlet temperature.

20. The refrigeration unit as recited in claim 15 wherein said valve position circuit is configured to employ separate proportional control algorithms based on a direction in which said expansion valve is repositioned.

21. The refrigeration unit as recited in claim 15 wherein said valve position circuit is configured to reposition said expansion valve proportionally only when said superheat error exceeds a lower threshold.

* * * * *